United States Patent
Wong et al.

(10) Patent No.: US 7,181,234 B2
(45) Date of Patent: Feb. 20, 2007

(54) METHOD AND APPARATUS FOR BRIDGING TALK GROUPS IN PUBLIC/PRIVATE COMMUNICATION SYSTEMS

(75) Inventors: Chin Pan Wong, Coral Springs, FL (US); Jose E. Korneluk, Boynton Beach, FL (US); Deborah Monks, Palatine, IL (US); Charles Jackson, Crystal Lake, IL (US); Brian K. Larson, Palatine, IL (US); Scott H. Richards, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 265 days.

(21) Appl. No.: 10/245,221

(22) Filed: Sep. 17, 2002

(65) Prior Publication Data

US 2004/0203978 A1 Oct. 14, 2004

(51) Int. Cl.
   *H04Q 7/20* (2006.01)
   *H04B 7/00* (2006.01)
   *H04M 3/42* (2006.01)

(52) U.S. Cl. .................. 455/519; 455/518; 455/416

(58) Field of Classification Search ............ 455/404.1, 455/404.2, 416, 417, 414.1, 414.4, 552.1, 455/554.1, 554.2, 555, 556.1, 556.2, 557, 455/507, 508, 517, 518, 519, 520, 521, 553.1, 455/11.1, 554; 340/287; 379/37; 370/466, 370/332, 328, 432
See application file for complete search history.

(56) References Cited

U.S. PATENT DOCUMENTS

| | | | | |
|---|---|---|---|---|
| 5,058,199 A | * | 10/1991 | Grube .................. | 455/15 |
| 5,311,570 A | * | 5/1994 | Grimes et al. .............. | 455/417 |
| 5,548,631 A | * | 8/1996 | Krebs et al. .............. | 455/426.1 |
| 5,592,533 A | * | 1/1997 | McHenry et al. ......... | 455/435.2 |
| 5,745,849 A | * | 4/1998 | Britton .................... | 455/404.1 |
| 5,857,144 A | * | 1/1999 | Mangum et al. ........... | 455/11.1 |
| 5,862,208 A | * | 1/1999 | MeLampy et al. ...... | 379/212.01 |
| 5,916,302 A | * | 6/1999 | Dunn et al. ................. | 709/204 |
| 5,970,417 A | * | 10/1999 | Toyryla et al. ............. | 455/519 |
| 6,052,574 A | * | 4/2000 | Smith, Jr. ................ | 455/404.2 |
| 6,081,707 A | * | 6/2000 | Christensen et al. ........ | 455/413 |
| 6,104,925 A | * | 8/2000 | Grube et al. ................ | 455/428 |
| 6,151,501 A | * | 11/2000 | Belkin et al. ............... | 455/436 |
| 6,154,658 A | * | 11/2000 | Caci .......................... | 455/466 |
| 6,163,692 A | * | 12/2000 | Chakrabarti et al. ........ | 455/416 |
| 6,226,528 B1 | * | 5/2001 | son .ANG.kerberg et al. ....................... | 455/426.1 |
| 6,272,347 B1 | * | 8/2001 | Griffith et al. .............. | 455/445 |
| 6,725,053 B2 | * | 4/2004 | Rosen et al. ................ | 455/518 |
| 6,950,674 B2 | * | 9/2005 | Jarrett ...................... | 455/552.1 |
| 2002/0037735 A1 | * | 3/2002 | Maggenti et al. ........... | 455/517 |
| 2004/0082352 A1 | * | 4/2004 | Keating et al. ............. | 455/519 |
| 2004/0192211 A1 | * | 9/2004 | Gallagher et al. ....... | 455/67.11 |

* cited by examiner

*Primary Examiner*—Tilahun Gesesse
(74) *Attorney, Agent, or Firm*—Barbara R. Doutre

(57) ABSTRACT

A communication system (100) for bridging talk groups includes private network communication devices (102) operating within a private network system, and public network communication devices (110, 122, 112) operating within a public network system. At least one communication subsystem (104) is operable with both the private and public network systems. The communication subsystem (104) relays information between the private network communication devices (102) and the public network communication devices (110, 122, 112).

3 Claims, 2 Drawing Sheets

METHOD AND APPARATUS FOR BRIDGING TALK GROUPS IN PUBLIC/PRIVATE COMMUNICATION SYSTEMS

CROSS REFERENCE TO RELATED APPLICATIONS

This application is related to U.S. patent application Ser. No. 10/245,244 by Wong et al., entitled "Method and Apparatus For Improved Location Determination in a Private Radio Network using a Public Network System," filed concurrently herewith, Ser. No. 10/245,134 by Claxton et al., entitled "Portable Communication Device used as an Accessory for a Mobile Communication System," filed concurrently herewith; Ser. No. 10/245,097 by Richards et al., entitled "Charging Device for Charging a Plurality of Devices," filed concurrently herewith and Ser. No. 10/245,137 by Richards et al., entitled "Portable Communication Device used as an Accessory for a Portable Two-Way Radio," filed concurrently herewith each assigned to Motorola, Inc.

BACKGROUND OF THE INVENTION

1. Field of the Invention

This invention relates in general to communication systems and in particular to bridging talkgroups in communication systems.

2. Description of the Related Art

With the increase in the number of public safety personnel involved in addressing major incidents, there is a need to "conference in" talk groups on different networks (dispatch to dispatch). For example, immigration officers may need to communicate with local police during an incident. Firefighters and police officers may also need to coordinate their efforts during an incident. These public safety personnel currently are unable to communicate with each other on separate private or public radio systems. Also, during incidents that require expert or high level official advice, public safety personnel may also need to add individuals who use public cellular telephony communications to their private talk systems (dispatch to cell). Historically, bridging public and private talk groups has not been feasible, because the effort to enable this at the network infrastructure level is quite high. There is a need for bridging talk groups to be accomplished on an ad hoc basis without operator intervention. Additionally, the ability to generate a record in a dispatch center recording the combined dialog of multiple talk groups would be highly beneficial.

Accordingly, there is a need for a communication system and method for facilitating the bridging of multiple talk groups from different systems as well as private/public systems.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

Figure 1:
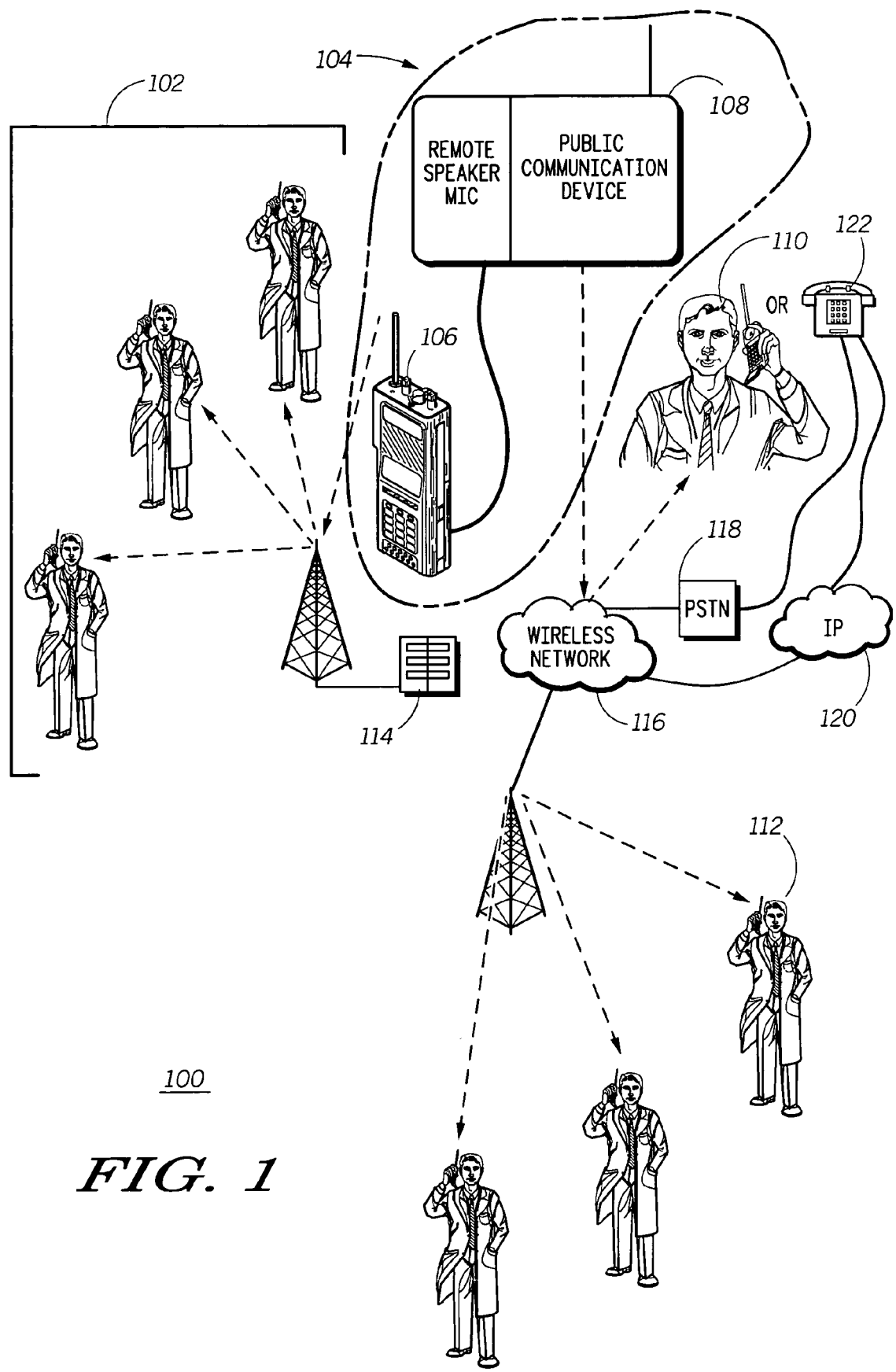
FIG. 1 is a system diagram of a communication system in accordance with the present invention.

FIG. 1 is a system diagram of a communication system in accordance with the present invention. Communication system 100 includes a plurality of communication devices 102 (which could be portable radios or mobile radios) operating within a first talk group communicating via a private network. In accordance with the present invention, the first talk group also includes a communication subsystem 104 having first and second communication units 106, 108 (here shown as two portable units but could also be mobile units as well). Subsystem 104 preferably includes a portable radio 106 having a public network device 108 electrically coupled thereto. The electrical coupling can be wired (as shown) or wireless. Public network device 108 can be an iDEN phone or other public network device that includes remote speaker microphone capability. The public network device 108 communicates via the public wireless network 116 to a third party having a cell phone 110 or a standard telephone 122 (through the wireless network 116, Public Switching Telephone Network 118 or Internet Protocol 120). Thus, a user of communication subsystem 104 can communicate with both the first talk group 102 via the private network and can also communicate with public communication devices 110, 122 via the public network. In the cell phone case, since the public cellular phone is not affiliated with a private network it does not present additional loading to the communication system 100.

A second talk group 112 operating within a public network system receives information from first private talk group 102 through the public network. Again, portable radio 106 receives information from the first talk group 102, transfers the information using public network device 108 using its public network capability 116 to a public dispatch talkgroup 112. Second talkgroup 112 can be formed of portable radios and/or mobile radios. By including at least one communication subsystem 104 that is operable with both the private and public network systems, public and private talk groups can now communicate with each other. System 100 may further include a recording device 114 for recording information relayed amongst the various talkgroups.

Figure 2:
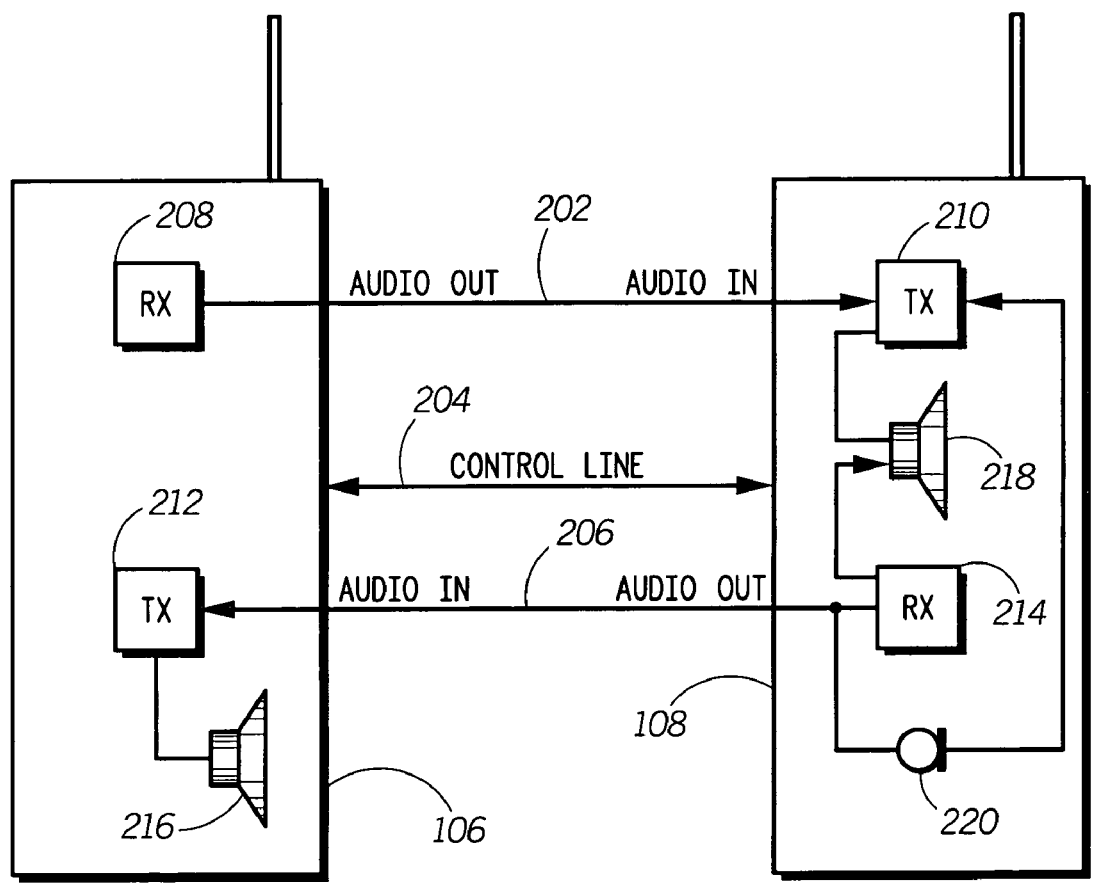
FIG. 2 is a more detailed block diagram of the communication subsystem of FIG. 1 in accordance with the present invention.

A user of subsystem 104 can also communicate directly with public and private groups at the same time by using the microphone located in the public network device 108 (to be shown in FIG. 2). If using the remote microphone mode, the user pushes a push-to-talk (PTT) button (not shown) to communicate with the first talk group using the private network as well as a second talkgroup using the public network. Alternatively, if device 108 is operating in a phone mode, the user can speak into the microphone without a PTT press and likewise have the audio transferred to private network communication units via the private network as well as public communication units via the public network.

FIG. 2 shows block diagram of the communication subsystem 104 operating in accordance with the present invention. Subsystem 104 includes private radio 106 including a receiver 208, a transmitter 212, and a speaker 216. Public radio 108 includes a transmitter 210, a receiver 214, a speaker 218, and a microphone 220. A control line 204 synchronizes and controls routing of audio between devices 106 and 108. Thus, an electrical link exists between private radio 106 and public radio 108 which as mentioned earlier can be wired or wireless.

Private radio 106 receives audio from the private network system (from other private radios) at receiver 208 and ports the audio through electrical link 202 to the transmitter 210 and speaker 218 of public radio 108. The audio is played out at speaker 218. The audio is also transmitted through transmitter 210 to the public network system to its ultimate destination—cell phone, standard telephone, or public dispatch radio.

Going in the other direction, public radio 108 receives audio from the public network system (from a cell home, standard telephone, or public dispatch radio) at receiver 214 and ports the audio through electrical link 206 to the transmitter 212 and speaker 216 of private radio 106. The audio is played out at speaker 216. The audio is also transmitted via transmitter 212 through the private network system to its ultimate destination—a private communication network device(s), such as a private radio talkgroup, for example. As mentioned earlier, the audio can be recorded to maintain a record of information relayed between the various groups.

For communication originating from the user of subsystem 104, the user can speak into the microphone 220 and communicate with both private and public talkgroups at the same time (i.e. simultaneously). Audio received at microphone 220 (whether through PTT or phone mode) is forwarded to transmitter 210 and electrical link 206. The audio is transmitted from transmitter 210 through the public network to public communication units. The audio ported over electrical link 206 goes to transmitter 212 of the private radio 106 for transmission through the private network system to private network communication units.

Thus, public radio devices including cell phones, standard telephones, and dispatch radios operating on public network systems can now all communicate with private radio systems and vice versa. Calls can now be transmitted and responded to dynamically between public/private networks. Different operating modes of a public network radio can now be transferred to a private network radio device. For example, iDEN phones have talkgroup, private call, and interconnect call. The communication system formed in accordance with the present invention, allows the private radios to advantageously use all three modes of operation, provided that the corresponding services are also available in the private network. By having at least one communication device from the private radio network include public network capability, audio can be relayed between private and public networks in both directions.

The ability to communicate between private and public allows the bridge between dissimilar types of technologies including GSM, CDMA, TDMA, FM, AM, etc. A system formed in accordance with the present invention can take advantage of three-way calling to extend the private network capacity. Talkgroups are now dynamically tied together. Calls from dissimilar parties not associated with the same private radio network can now communicate with each other.

Accordingly, there has been provided a communication system in which extends the number of users that can communicate with a private network radio group. The communication system 100 of the present invention includes, but is not limited to, the following capabilities: public interconnect to private talk groups; public talkgroups to private talk groups; public dispatch to private talkgroups; and public interconnect to private dispatch. These are just a few of the capabilities system 100. Bridging private dispatch/talkgroups to public cellular telephony is an important advantage in that the private radio networks dedicated to public service can now extend the number of users that can use the system. Conventional/trunked communication systems can now be bridged to public cellular systems as well. Improved efficiency and improved response times can be achieved with a system formed in accordance with the present invention.

Although the invention has been described in terms of preferred embodiments, it will be obvious to those of ordinary skill in the art that various alterations and modifications may be made without departing from the invention. Accordingly, it is intended that all such alterations and modifications be considered as within the spirit and scope of the invention as defined by the appended claims.

What is claimed is:

1. A communication system, comprising:
a first talk group operating over a private radio network;
a second talk group operating over a public radio network;
at least one communication device in the first talk group having public network capability, the at least one communication device being either portable or mobile;
the at least one communication device relaying audio from the first talk group to the second talk group over the public network; and
wherein the at least one communication device includes:
a first receiver operable in the private network; and
a first transmitter operable in the private network;
a second receiver operable in the public network;
a second transmitter operable in the public network; and
wherein audio received from the private network at the first receiver is ported via an electrical link to the second transmitter;
and
wherein audio received from the public network at the second receiver is ported via the electrical link to the first transmitter.

2. The communication system of claim 1, wherein the electrical link is wireless.

3. The communication device of claim 1, wherein the electrical link is wired.

* * * * *